(12) United States Patent
Gao et al.

(10) Patent No.: US 12,344,167 B2
(45) Date of Patent: Jul. 1, 2025

(54) METHOD AND DEVICE FOR DISPLAYING PARKING PROCESS, VEHICLE AND STORAGE MEDIUM

(71) Applicant: GREAT WALL MOTOR COMPANY LIMITED, Baoding (CN)

(72) Inventors: Tong Gao, Baoding (CN); Jinke Wu, Baoding (CN); Yanna Cao, Baoding (CN); Dongchun Xu, Baoding (CN); Hong Wei, Baoding (CN); Xiangxiang Wang, Baoding (CN); Bingquan Guo, Baoding (CN); Lidong Yuan, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 196 days.

(21) Appl. No.: 18/010,398

(22) PCT Filed: Sep. 30, 2021

(86) PCT No.: PCT/CN2021/122272
§ 371 (c)(1),
(2) Date: Dec. 14, 2022

(87) PCT Pub. No.: WO2022/073461
PCT Pub. Date: Apr. 14, 2022

(65) Prior Publication Data
US 2023/0249620 A1 Aug. 10, 2023

(30) Foreign Application Priority Data
Oct. 9, 2020 (CN) .......................... 202011075349.3

(51) Int. Cl.
*B60R 1/27* (2022.01)
*G06V 20/58* (2022.01)
*B60W 30/06* (2006.01)

(52) U.S. Cl.
CPC .............. *B60R 1/27* (2022.01); *G06V 20/586* (2022.01); *B60R 2300/10* (2013.01);
(Continued)

(58) Field of Classification Search
CPC . B60R 1/27; B60R 2300/806; B60R 2300/20; B60R 2300/10; G06V 20/586; B60W 30/06
See application file for complete search history.

(56) References Cited

U.S. PATENT DOCUMENTS 11,110,914 B2 * 9/2021 Ayyappan ............ G06V 20/586
11,418,693 B2 * 8/2022 An ........................ G06V 20/586
(Continued)

FOREIGN PATENT DOCUMENTS

CN 1591257 3/2005
CN 103568946 2/2014
(Continued)

OTHER PUBLICATIONS

Chinese Office Action for Application No. 202011075349.3, mailed Jun. 2021 (5 pages).
(Continued)

*Primary Examiner* — Mohamed A. Wasel
(74) *Attorney, Agent, or Firm* — NIXON PEABODY LLP; Jeffrey L. Costellia

(57) ABSTRACT

Provided are method and device for displaying a parking process, and a vehicle. The method includes creating an image used for reflecting a scene where a vehicle is located; determining a display region of the image, and displaying the display region; identifying parking spots in the image; when at least part of a region of a target parking spot among all the parking spots and/or of a vehicle is located outside the display region, adjusting the position of the center of the display region of the image with respect to the origin of a (Continued)

preset coordinate system, so that the whole regions of the vehicle and the target parking spot are located in the display region.

17 Claims, 8 Drawing Sheets

(52) U.S. Cl.
  CPC ..... *B60R 2300/20* (2013.01); *B60R 2300/806* (2013.01); *B60W 30/06* (2013.01)

(56) References Cited

U.S. PATENT DOCUMENTS

| | | | | |
|---|---|---|---|---|
| 11,541,881 | B2* | 1/2023 | Wang | ........................ G06T 5/70 |
| 12,174,031 | B2* | 12/2024 | Ishinoda | ............ G01C 21/3807 |
| 2010/0238051 | A1 | 9/2010 | Suzuki et al. | |
| 2014/0163862 | A1* | 6/2014 | Choi | ..................... B60W 30/06 |
| | | | | 701/400 |
| 2014/0354452 | A1 | 12/2014 | Okuyama | |
| 2015/0258989 | A1 | 9/2015 | Okano et al. | |
| 2017/0108873 | A1* | 4/2017 | Tanaka | .................. B60W 50/14 |
| 2018/0099661 | A1* | 4/2018 | Bae | ....................... B60W 30/06 |
| 2019/0071070 | A1* | 3/2019 | Kato | .................. B62D 15/0285 |
| 2019/0180621 | A1* | 6/2019 | Matsuda | ................. B60R 21/00 |
| 2020/0133297 | A1* | 4/2020 | Ando | .................. B62D 15/0285 |
| 2020/0398865 | A1* | 12/2020 | Tsujino | ............. B60W 60/0025 |
| 2022/0118907 | A1* | 4/2022 | Onishi | ................... H04N 7/181 |

FOREIGN PATENT DOCUMENTS

| | | |
|---|---|---|
| CN | 109693666 | 4/2019 |
| CN | 110239524 | 9/2019 |
| CN | 110293962 | 10/2019 |
| CN | 110794970 | 2/2020 |
| CN | 111559371 | 8/2020 |
| CN | 111591283 | 8/2020 |
| CN | 112339771 | 2/2021 |
| DE | 10-2011-105884 | 1/2013 |
| KR | 10-2020-0102013 | 8/2020 |

OTHER PUBLICATIONS

International Search Report for Application No. PCT/CN2021/122272, mailed Dec. 30, 2021 (4 pages).
Extended European Search Report for App. No. 21876979.2, dated Nov. 3, 2023 (9 pages).

* cited by examiner

METHOD AND DEVICE FOR DISPLAYING PARKING PROCESS, VEHICLE AND STORAGE MEDIUM

CROSS-REFERENCE TO RELATED APPLICATIONS

This application is a national phase of PCT application No. PCT/CN2021/122272, filed on Sep. 30, 2021, which claims the priority of the Chinese patent application filed on Oct. 9, 2020 before the CNIPA, China National Intellectual Property Administration with the application number 202011075349.3 and the title of "PARKING PROCESS DISPLAY METHOD AND DEVICE, AND VEHICLE", which is incorporated herein in its entirety by reference.

TECHNICAL FIELD

The present disclosure relates to the technical field of automobiles, and more particularly, to a parking process display method and device, and a vehicle.

BACKGROUND

With the popularization of private automobiles, the development of automatic parking technology provides a solution to the problem of difficult parking for users.

The existing automatic parking uses the automatic parking function of a vehicle to park the vehicle in/out of a parking spot according to a parking in/out instruction. During a parking process, a parking image shot by a vehicle-mounted camera is displayed via a display window with a fixed field of view, of a display screen of a vehicle-mounted terminal of the vehicle.

SUMMARY

For this purpose, the present disclosure aims at providing a parking process display method and device, and a vehicle.

Technical solutions of the present disclosure are achieved in such a manner:

Provided is a parking process display method applied to a vehicle-mounted terminal of a vehicle, wherein the method includes:
  establishing an image of a scene where the vehicle is located, and the image is established based on a preset coordinate system;
  determining a display region in the image, and displaying the display region, the display region including the vehicle;
  identifying a parking spot in the image; and
  when at least parts of regions of a target parking spot and/or of the vehicle are located outside the display region, adjusting a relative position of a center of the display region in the image to an origin of the preset coordinate system, to enable entire regions of the vehicle and the target parking spot to be located in the display region.

Provided is a parking process display device applied to a vehicle-mounted terminal of a vehicle, wherein the device includes:
  an establishment module configured for, establishing an image of a scene where the vehicle is located, and the image is established based on a preset coordinate system;
  a determination module configured for, determining a display region in the image, and display the display region, the display region comprising the vehicle;
  an identification module configured for, identifying a parking spot in the image; and
  an adjustment module configured for, when at least parts of regions of a target parking spot and/or of the vehicle are located outside the display region, adjusting a relative position of a center of the display region in the image to an origin of the preset coordinate system, to enable entire regions of the vehicle and the target parking spot to be located in the display region.

Provided is a vehicle, the vehicle including a vehicle-mounted terminal, wherein the vehicle further includes the parking process display device.

The above description is merely a summary of the technical solutions of the present disclosure. In order to more clearly know about the technical means of the present disclosure to enable the implementation according to the contents of the description, and in order to make the above-mentioned and other purposes, features and advantages of the present disclosure more apparent and understandable, specific embodiments of the present disclosure are provided below.

BRIEF DESCRIPTION OF THE DRAWINGS

The accompanying drawings serving as a part of the present disclosure is provided for further understanding the present disclosure. Exemplary embodiments of the present disclosure and their descriptions are intended to explain the present disclosure, rather than to constitute improper limitations on the present disclosure. In the accompanying drawings.

DETAILED DESCRIPTION OF THE EMBODIMENTS

In order to make objectives, technical solutions and advantages of embodiments of the present disclosure clearer, the technical solutions in the embodiments of the present disclosure will be clearly and completely described below with reference to the accompanying drawings in the embodiments of the present disclosure. Apparently, the described embodiments are merely a part of embodiments of the present disclosure, rather than all of the embodiments. All of the other embodiments that the ordinary skill in the art obtains on the basis of the embodiments of the present disclosure without paying creative work fall within the protection scope of the present disclosure.

It needs to be noted that the embodiments in the present disclosure and features in the embodiments may be combined with each other without conflicts.

The present disclosure will be described in detail below with reference to the accompanying drawings and embodiments.

Figure 1:
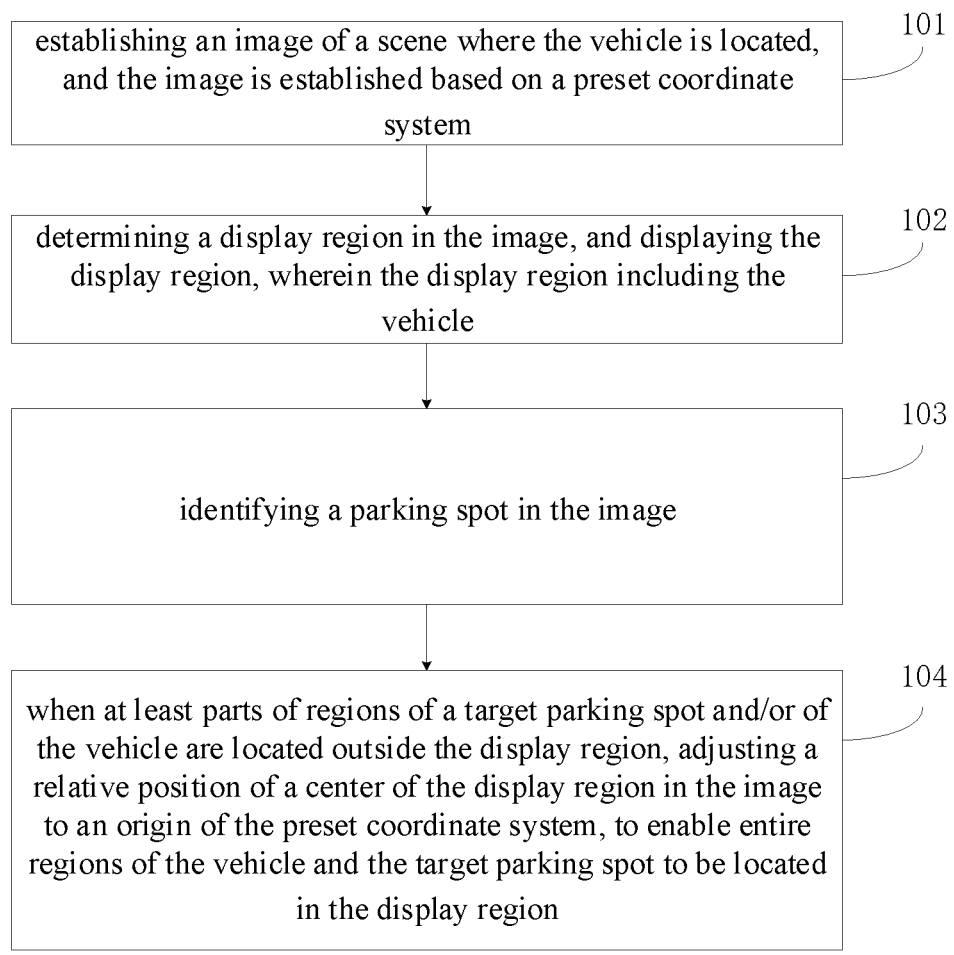
FIG. 1 shows a flow chart of a parking process display method according to an embodiment of the present disclosure.

As referred to FIG. 1, FIG. 1 shows a flow chart of a parking process display method according to an embodiment of the present disclosure.

The parking process display method provided according to the embodiment of the present disclosure is applied to a vehicle-mounted terminal of a vehicle.

Step 101: establishing an image of a scene where the vehicle is located, and the image is established based on a preset coordinate system.

Figure 2:
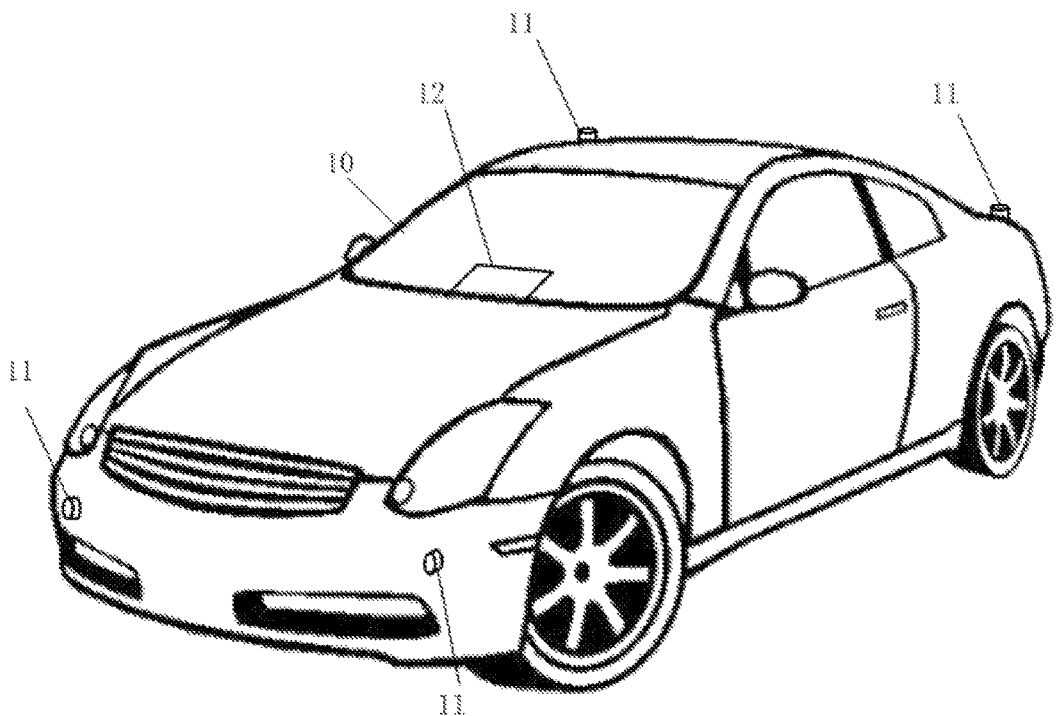
FIG. 2 shows a structural diagram of a vehicle according to an embodiment of the present disclosure.

In the embodiment of the present disclosure, as referred to FIG. 2, FIG. 2 shows a structural diagram of a vehicle according to an embodiment of the present disclosure, which includes a vehicle 10, wide-angle sensors 11, and a vehicle-mounted terminal 12. There may be a plurality of wide-angle sensors 11, a plurality of the wide-angle sensors 11 are disposed on the outer surface of the vehicle 10, and data collected by the wide-angle sensors 11 may be sent to the vehicle-mounted terminal 12. Optionally, four wide-angle sensors 11 may be provided, and the four wide-angle sensors 11 are disposed on four corners of the vehicle 10, respectively.

The wide-angle sensors 11 are used for collecting image data and are wider in shooting field of view and capable of collecting images of ambient environments of the vehicle 10, and a plurality of the disposed wide-angle sensors 11 may provide real-time images with a three hundred and sixty degrees angle surrounding the vehicle to the vehicle-mounted terminal 12, thereby providing a wider field of view for a driver and eliminating the blind region of the field of view as much as possible.

Figure 3:
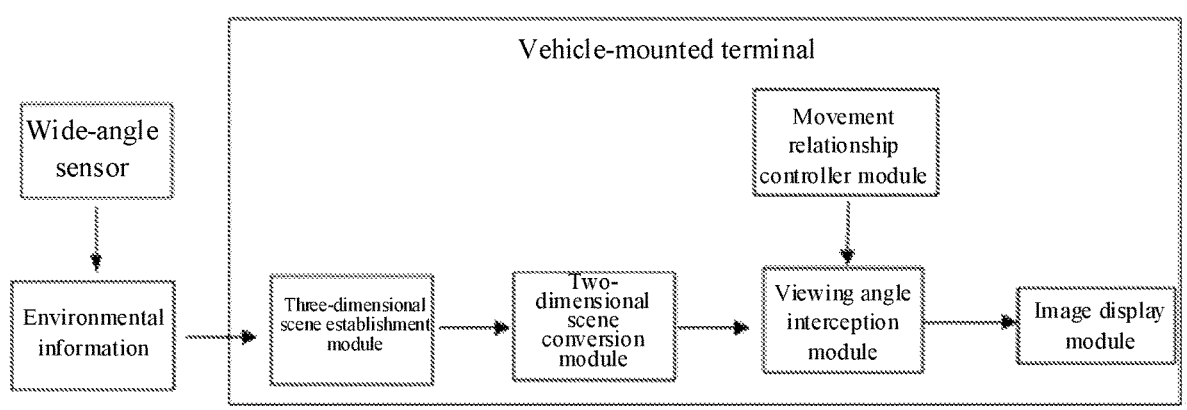
FIG. 3 shows a structural block diagram of a vehicle-mounted terminal according to an embodiment of the present disclosure.

Optionally, as referred to FIG. 3, FIG. 3 shows a structural block view of a vehicle-mounted terminal according to an embodiment of the present disclosure, the vehicle-mounted terminal includes a three-dimensional scene establishment module, a two-dimensional scene conversion module, a viewing angle interception module, a movement relationship controller module, and an image display module.

The three-dimensional scene establishment module may establish a three-dimensional scene image of the scene where the vehicle is located on the basis of environmental information collected by the wide-angle sensors, the three-dimensional scene image may be displayed by the image display module, so as to provide a user perception for a three-dimensional scene.

A two-dimensional scene establishment module may map the three-dimensional scene image into a planar two-dimensional scene image at the top viewing angle, on the basis of the three-dimensional scene image established by the three-dimensional scene establishment module, and according to a top viewing angle set in a parking scene.

The movement relationship controller module may collect information of movement parameters such as a speed, a direction, and a trajectory, etc., of the vehicle.

Due to the limited field of view of the display of the vehicle-mounted terminal, it may only display parts of regions in the two-dimensional scene image at one time, and therefore, the viewing angle interception module may control the interception of the parts of regions on the basis of the movement parameters, collected by the movement relationship controller module of the vehicle, and may enable a parking spot to be parked and a vehicle located in the parts of regions at the same time.

The image display module may display the parts of regions in the two-dimensional scene image selected by the viewing angle interception module, so as to provide a user perception for a parking process.

In this step, the two-dimensional scene establishment module of the vehicle-mounted terminal may map the three-dimensional scene image into the planar two-dimensional scene image at the top viewing angle according to the top viewing angle set in the parking scene, and the two-dimensional scene image may be established on the basis of the preset coordinate system such as a rectangular coordinate system. As referred to FIG. 4, FIG. 4 shows a structural diagram of a two-dimensional scene image according to an embodiment of the present disclosure, a two-dimensional scene image 20 which is at the top viewing angle and includes a vehicle 10 is established on the basis of the three-dimensional scene image, and reference may be made to the position of each object in the two-dimensional scene image 20.

Step 102: determining a display region in the image, and displaying the display region, wherein the display region including the vehicle.

In the embodiment of the present disclosure, the image may be the two-dimensional scene image or the three-dimensional scene image, which is not limited in the embodiment of the present disclosure. By taking the two-dimensional scene image as an example, due to the limited field of view of the display of the vehicle-mounted terminal, it may only display parts of regions in the two-dimensional scene image at one time, and therefore, the display region with a preset size in the two-dimensional scene image may be selected by the viewing angle interception module of the vehicle-mounted terminal, and the display region is displayed by the image display module of the vehicle-mounted terminal. The size of the display region may be obtained by calculating according to the size or resolution of the display of the vehicle-mounted terminal.

Figure 4:
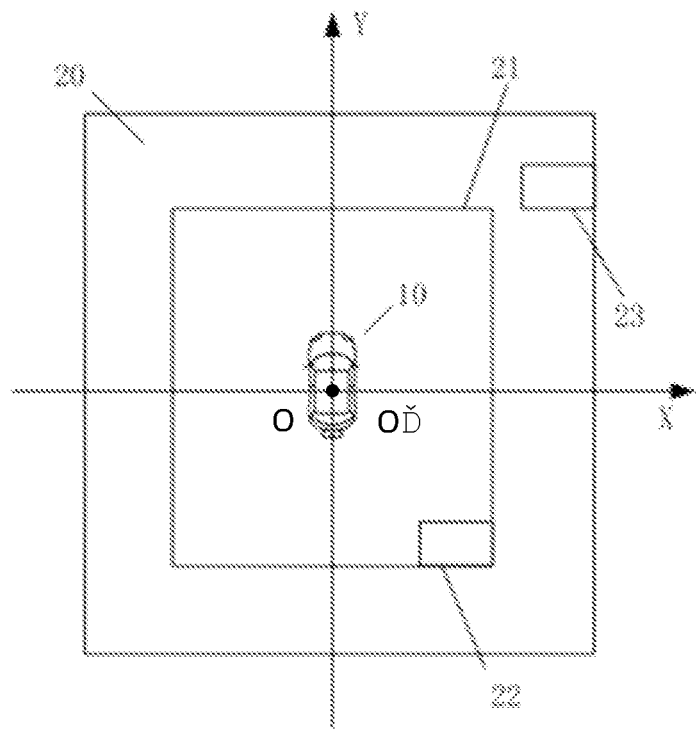
FIG. 4 shows a structural diagram of a two-dimensional scene image according to an embodiment of the present disclosure.

Specifically, as referred to FIG. 4, it is necessary for the selected display region 21 to include the vehicle 10 because it involves a parking scene. In addition, in an initial state (namely a state as shown in FIG. 4), the center of the vehicle 10 may overlap with the origin of the XY rectangular coordinate system of the two-dimensional scene image 20, and the center of the display region 21 may also overlap with the origin, in this way, the vehicle-mounted terminal may display the display region 21 with the vehicle 10 as the center in the initial state, so that a user knows about the environmental condition surrounding the vehicle before parking. Certainly, in the initial state, the center of the display region, the center of the coordinate system and the center of the vehicle may also be kept in a preset relative positional relationship, other than overlapping according to practical demands, which is not limited in the embodiment of the present disclosure.

Step 103: identifying a parking spot in the image.

In this step, the vehicle-mounted terminal may identify all parking spots in the image based on an image feature identification technology.

Specifically, the vehicle-mounted terminal may match an image feature of a standard parking spot with an image feature of each region in the image, and determine a region that matches the image feature of the standard parking spot in the image, as the region where the parking spot is located.

Step 104: when at least parts of regions of a target parking spot and/or of the vehicle are located outside the display region, adjusting a relative position of a center of the display region in the image to an origin of the preset coordinate system, to enable entire regions of the vehicle and the target parking spot to be located in the display region.

In the embodiment of the present disclosure, the target parking spot may be a parking spot to be parked in or out in all the parking spots. When there are a plurality of parking spots in the image, the target parking spot may be voluntarily selected by a user or may be selected by the vehicle-mounted terminal according to an practical strategy. For example, a parking spot closest to the vehicle and in a direction in which the vehicle satisfies a parking-in/out condition is determined as the target parking spot. For example, in FIG. 4, if it is identified by the vehicle-mounted terminal that there are two parking spots in the image 20: a parking spot 22 and a parking spot 23, the parking spot 23 may be used as the target parking spot according to a selection operation of the user, or the parking spot 22 closest to the vehicle 10 may be automatically determined as the target parking spot.

Figure 5:
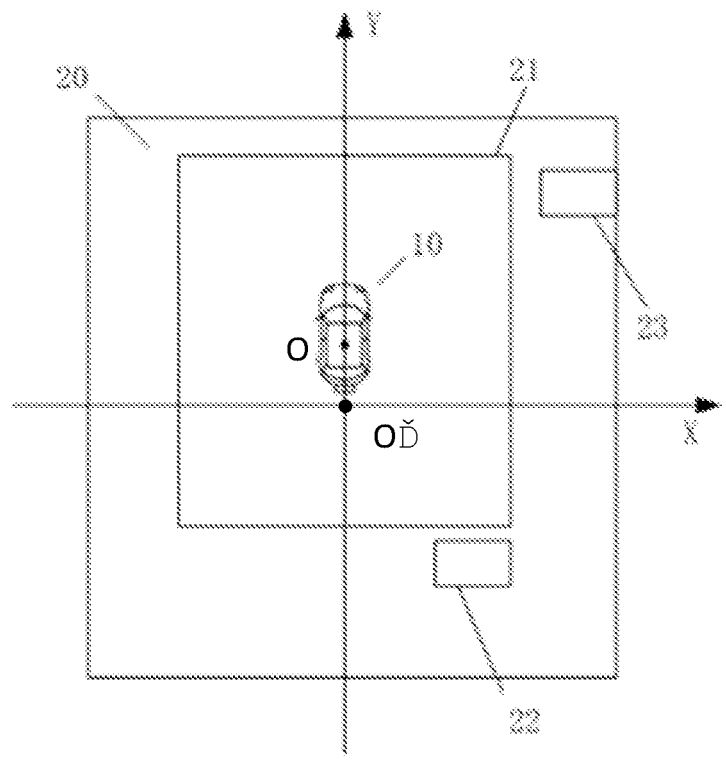
FIG. 5 shows a structural diagram of another two-dimensional scene image according to an embodiment of the present disclosure.

Since the display of the vehicle-mounted terminal is fixed in field of view, and the vehicle is in a moving state in a parking process, as referred to FIG. 5, FIG. 5 shows a structural diagram of another two-dimensional scene image according to an embodiment of the present disclosure, assuming that the parking spot 22 is the target parking spot, and the vehicle 10 moves in a Y-axis direction, if the center O of the display region 21 is kept to overlap with the center of the vehicle 10 in the movement process of the vehicle 10, the target parking spot 22 may entirely (as shown in FIG. 5) or partially move out of the range of the display region 21 in the movement process of the vehicle 10, which causes the loss of the image of the target parking spot 22. Similarly, if the center O of the display region 21 does not overlap with the center of the vehicle 10, but is kept to overlap with the origin O' of the coordinate system in the movement process of the vehicle 10, the vehicle 10 may entirely or partially move out of the range of the display region 21 in the movement process of the vehicle 10, which causes the loss of the image of the vehicle 10.

Therefore, according to the embodiment of the present disclosure, the relative position of the center of the display region in the image to the origin of the coordinate system may be adjusted according to the target parking spot in the image and the direction of the vehicle, so that the entire regions of the vehicle and the target parking spot are located in the display region in the parking process, and then, the problem of less satisfying of parking experience caused by the loss of the images of the vehicle and the target parking spot is reduced.

Figure 6:
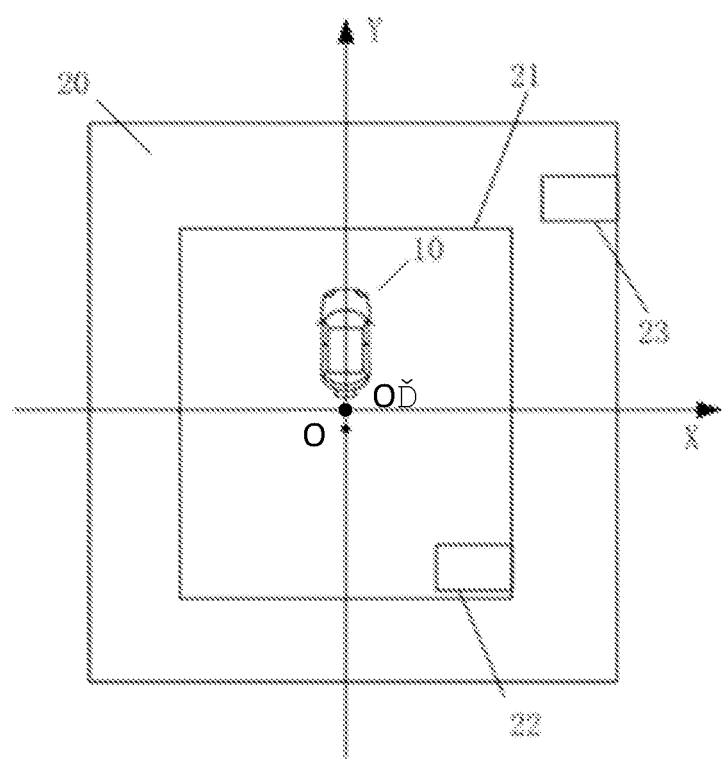
FIG. 6 shows a structural diagram of another two-dimensional scene image according to an embodiment of the present disclosure.

For example, if the vehicle 10 moves in the Y-axis direction on the basis of the situation as shown in FIG. 5, in order to prevent the target parking spot 22 from being moved out of the display region 21, as referred to FIG. 6, FIG. 6 shows a structural diagram of another two-dimensional scene image according to an embodiment of the present disclosure, the center O of the display region 21 may be moved in a direction away from the Y-axis direction to change a positional relationship between the center O of the display region 21 and the origin O' of the coordinate system, so that the vehicle 10 and the target parking spot 22 are located in the display region 21 at the same time, which guarantees the integrity of a parking image in a parking link.

In summary, the embodiment of the present disclosure provides the parking process display method including: establishing an image of a scene where the vehicle is located, and the image is established based on a preset coordinate system; determining a display region in the image, and displaying the display region, wherein the display region including the vehicle; identifying a parking spot in the image; when at least parts of regions of a target parking spot and/or of the vehicle are located outside the display region, adjusting a relative position of a center of the display region in the image to an origin of the preset coordinate system, to enable entire regions of the vehicle and the target parking spot to be located in the display region. In the embodiment of the present disclosure, since the display of the vehicle-mounted terminal is limited in display range, in order to guarantee the integrity of the parking image displayed in the display region in the parking process, in the embodiment of the present disclosure, when the images of the target parking spot and/or vehicle in the display region are incomplete, the relative position of the center of the display region to the origin of the coordinate system of the image may be adjusted to change the position of the display region with respect to the image, so that the entire regions of the vehicle and the target parking spot are located in the display region, and then, the probability that the problem of integrity loss of the parking image in the parking process occurs is reduced.

Figure 7:
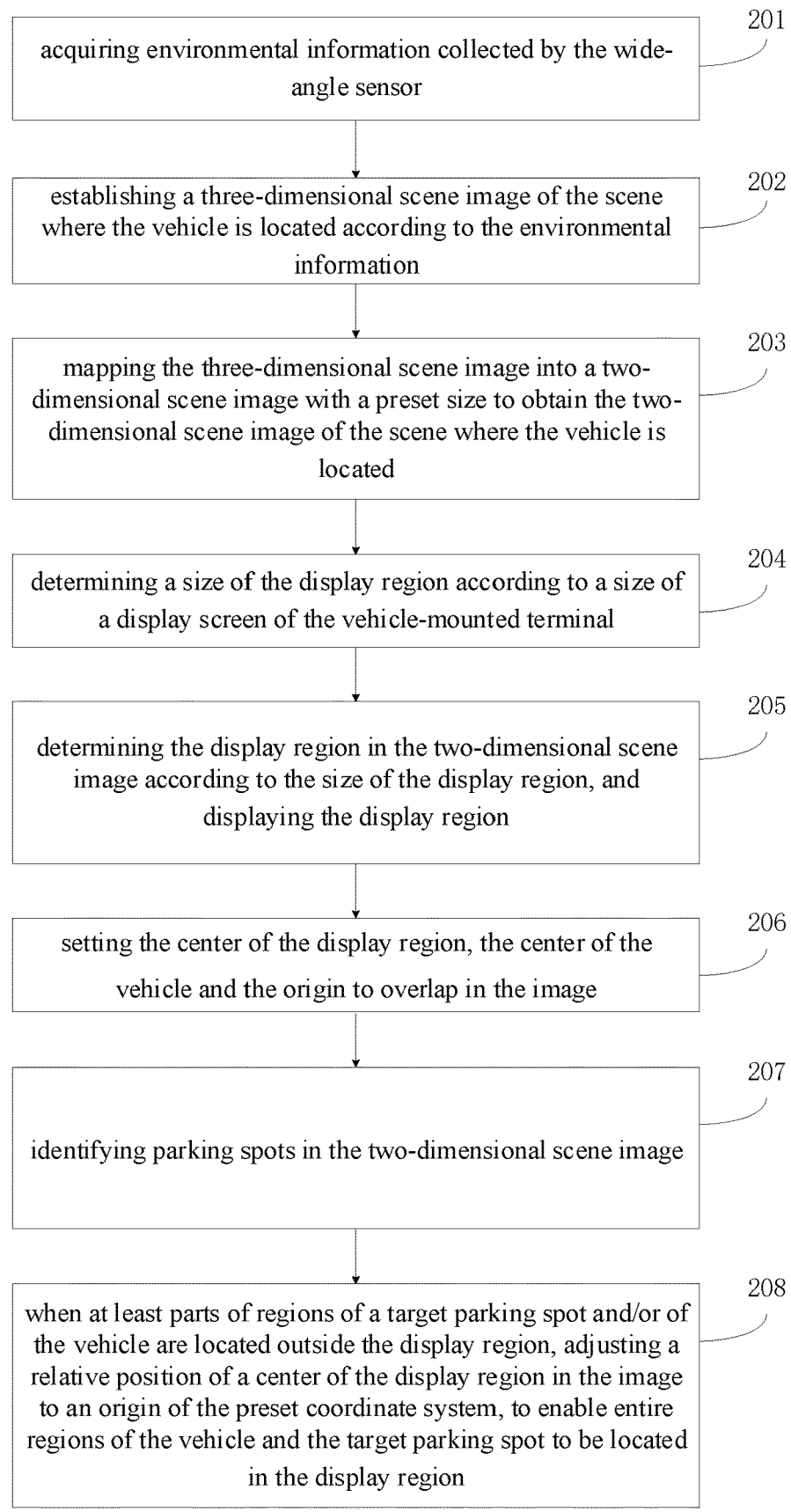
FIG. 7 shows a flow chart of another parking process display method according to an embodiment of the present disclosure.

As referred to FIG. 7, FIG. 7 shows a flow chart of another parking process display method according to an embodiment of the present disclosure. The parking process display method provided according to the embodiment of the present disclosure is applied to a vehicle-mounted terminal of a vehicle. Exemplarily, another parking process display method is described with a two-dimensional scene image as an example in the embodiment of the present disclosure. As referred to FIG. 2, a vehicle 10 is provided with at least one wide-angle sensor 11.

Step 201: acquiring environmental information collected by the wide-angle sensor.

The wide-angle sensors are used for collecting image data and are wider in shooting field of view and capable of collecting environmental information of ambient environments of the vehicle, wherein the environmental information may include point cloud data which is a set of point data, obtained by a measuring instrument, of the outer surface of objects in an environment and is used for establishing a three-dimensional scene image; and a plurality of disposed wide-angle sensors may provide real-time images with a three hundred and sixty degrees angle surrounding the vehicle for the vehicle-mounted terminal, thereby providing a wider field of view for a driver and eliminating the blind region of the field of view as much as possible.

Step 202: establishing a three-dimensional scene image of the scene where the vehicle is located according to the environmental information.

In the embodiment of the present disclosure, as referred to FIG. 2, the three-dimensional scene module of the vehicle-mounted terminal may establish the three-dimensional scene image of the scene where the vehicle is located by means of the point cloud data in the environmental information. Specifically, the process of establishing the three-dimensional scene image may be achieved by a fitting operation of the point cloud data and may be assisted by a deep learning model.

Step 203: mapping the three-dimensional scene image into a two-dimensional scene image with a preset size to obtain the two-dimensional scene image of the scene where the vehicle is located.

In the embodiment of the present disclosure, as referred to FIG. 2, the two-dimensional scene establishment module may map the three-dimensional scene image into a planar two-dimensional scene image at the top viewing angle, on the basis of the three-dimensional scene image established by a three-dimensional scene establishment module and according to a top viewing angle set in a parking scene.

Specifically, since a clearer effect on displaying the movement trajectory of the vehicle, and contours of the vehicle and the parking spots at the top viewing angle, the parking scene may be defaulted to be displayed at the top viewing angle.

Step 204: determining a size of the display region according to a size of a display screen of the vehicle-mounted terminal.

In the embodiment of the present disclosure, as referred to FIG. 2, a display of the vehicle-mounted terminal is limited in field of view, and may only display parts of regions in the two-dimensional scene image as the display region at one time, and therefore, the viewing angle interception module may firstly determine the size of the display region according to the size of the display screen of the vehicle-mounted terminal, so that the size of the display region does not exceed the field of view of the display of the vehicle-mounted terminal at least. For example, the size of the display region may be obtained by calculating according to the size or resolution of the display of the vehicle-mounted terminal.

Step 205: determining the display region in the two-dimensional scene image according to the size of the display region, and displaying the display region.

In the embodiment of the present disclosure, as referred to FIG. 2, after the viewing angle interception module determines the size of the display region, the specific position of the display region in the two-dimensional scene image may be selected; under a normal circumstance, a parking spot to be parked and the vehicle are enabled to be located in the display region at the same time as much as possible; and under other circumstances, the display region may also be located on a default fixed position in the two-dimensional scene image according to an practical demand.

Step 206: setting the center of the display region, the center of the vehicle and the origin to overlap in the image.

Wherein in a movement process of the vehicle, the center of the display region is kept to overlap with the center of the vehicle, or the center of the display region is kept to overlap with the origin.

In the embodiment of the present disclosure, in an initial state (namely a state as shown in FIG. 4), the center of the vehicle 10 may overlap with the origin O' of the XY rectangular coordinate system of the two-dimensional scene image 20, and the center O of the display region 21 is set to overlap with the origin O', in this way, the vehicle-mounted terminal may display the display region 21 with the vehicle 10 as the center in the initial state, so that a user knows about the environmental condition surrounding the vehicle before parking.

Optionally, since the two-dimensional scene image may be updated according to real-time environmental information, in an implementation situation, the center of the display region may be kept to overlap with the center of the vehicle in the movement process of the vehicle, so that the effect of keeping the vehicle located in the center of the display region is achieved, and it is convenient to get a perception range of the environmental condition surrounding the vehicle as wide as possible. For example, the center of the display region is kept to overlap with the center of the vehicle in the movement process of the vehicle, which facilitates finding an appropriate parking spot in the environment surrounding the vehicle. In another implementation situation, it is possible that the center of the display region may be kept to overlap with the origin in the movement process of the vehicle, in this way, the display region may be located in the central region of the two-dimensional scene image, so that the movement trajectory of the vehicle in the movement process may be clearly displayed in the display region, which facilitates intuitively displaying the operation such as advancing and reversing of the vehicle.

Step 207: identifying parking spots in the two-dimensional scene image.

This step may specifically refer to the above-mentioned step 103, the descriptions thereof are omitted herein.

Step 208: when at least parts of regions of a target parking spot and/or of the vehicle are located outside the display region, adjusting a relative position of a center of the display region in the image to an origin of the preset coordinate system, to enable entire regions of the vehicle and the target parking spot to be located in the display region.

This step may specifically refer to the above-mentioned step 104, the descriptions thereof are omitted herein.

Optionally, step 208 may include:

Substep 2081, when at least part of the region of the target parking spot is located outside the display region, identifying the movement direction of the vehicle in the image; and Substep S1, the relative position of the center of the display region to the origin is adjusted according to the movement direction of the vehicle.

In the embodiment of the present disclosure, the vehicle-mounted terminal may identify all the parking spots in the two-dimensional scene image based on an image feature identification technology. The target parking spot may be a parking spot to be parked in or out in all the parking spots. When there are a plurality of parking spots in the two-dimensional scene image, the target parking spot may be voluntarily selected by a user or may be selected by the vehicle-mounted terminal according to an practical strategy. For example, a parking spot closest to the vehicle and in a direction in which the vehicle satisfies a parking-in/out condition is determined as the target parking spot.

As referred to FIG. 2, the movement relationship controller module of the vehicle-mounted terminal may collect information of movement parameters such as a speed, a direction, and a trajectory of the vehicle, and identify the movement direction of the vehicle in the two-dimensional scene image according to the movement parameters when at least part of the region of the target parking spot is located outside the display region. The above-mentioned substep S1 includes a substep 2082 and/or a substep 2083.

Substep 2082, when the target parking spot is located on the side pointed by the movement direction of the vehicle, the center of the display region is moved in the movement direction to change the relative position of the center of the display region to the origin.

Figure 8:
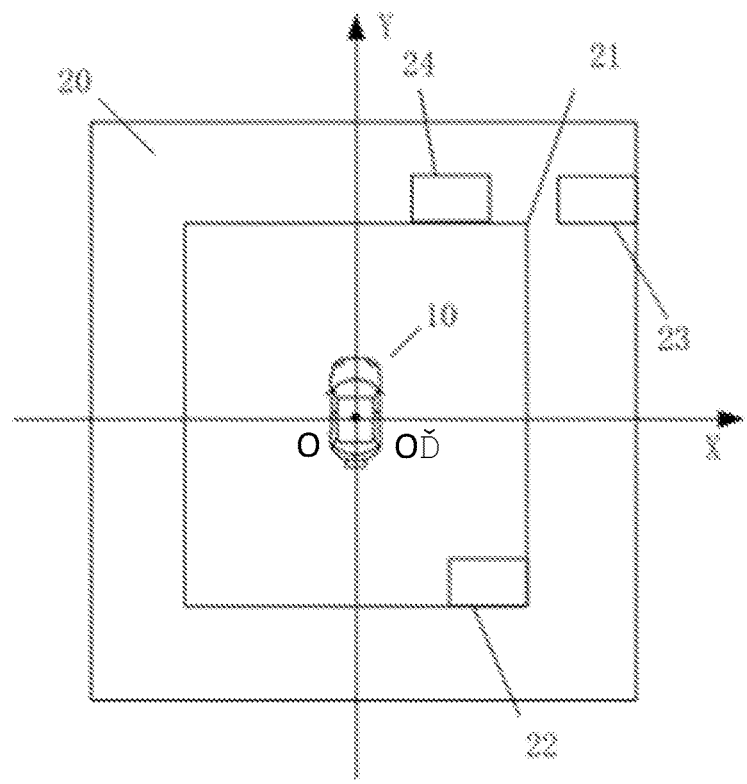
FIG. 8 shows a structural diagram of another two-dimensional scene image according to an embodiment of the present disclosure.

In this step, as referred to FIG. 8, FIG. 8 shows a structural diagram of another two-dimensional scene image according to an embodiment of the present disclosure. For example, assuming that a parking spot 24 is the target parking spot, and the vehicle 10 moves in a forward direction of the Y axis, moreover, the target parking spot 24 is located on the side pointed by the movement direction of the vehicle 10, and the target parking spot 24 is entirely moved out of the range of the display region 21, which causes the loss of the image of the target parking spot 24.

Figure 9:
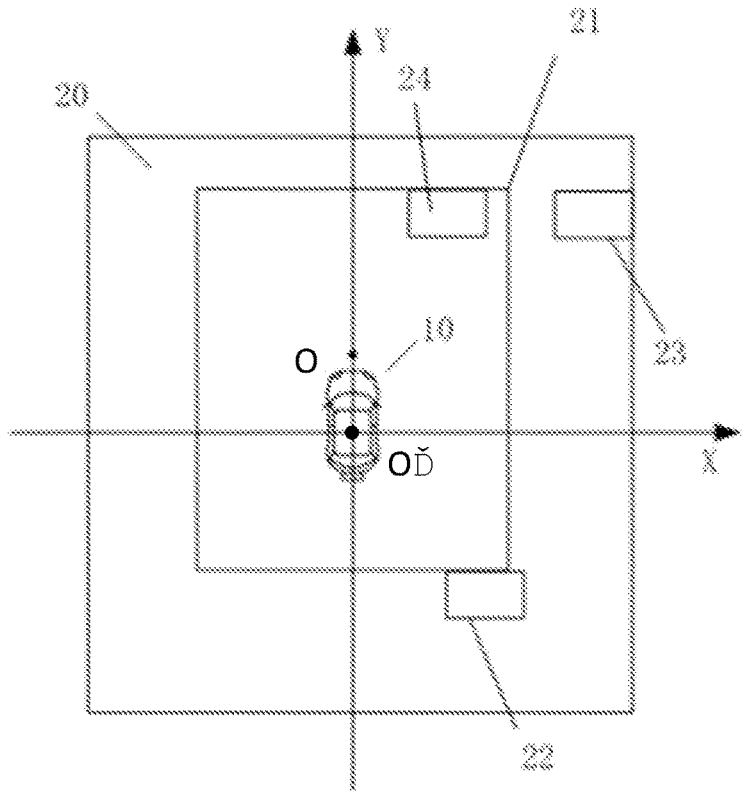
FIG. 9 shows a structural diagram of another two-dimensional scene image according to an embodiment of the present disclosure.

Therefore, according to the embodiment of the present disclosure, the relative position of the center of the display region in the two-dimensional scene image to the origin of the coordinate system may be adjusted according to the target parking spot in the two-dimensional scene image, the direction of the vehicle, and the movement direction of the vehicle. Specifically, the center O of the display region 21 in FIG. 8 is moved in the movement direction to change the relative position of the center O of the display region 21 to the origin O' to obtain a new relative position of the center O of the display region 21 in FIG. 9 to the origin O', so that the entire regions of the vehicle 10 and the target parking spot 24 are located in the display region in the parking process (as shown in FIG. 9), and then, the problem of less satisfying of parking experience caused by the loss of the images of the vehicle and the target parking spot is reduced.

Substep 2083, when the target parking spot is located on the side pointed by a direction away from the movement direction of the vehicle, the center of the display region is moved in the direction away from the movement direction to change the relative position of the center of the display region to the origin.

In this step, as referred to FIG. 5, assuming that the parking spot 22 is the target parking spot, the vehicle 10 moves in a Y-axis direction, moreover, the target parking spot 22 is located on the side pointed by a direction away from the movement direction of the vehicle 10, and the target parking spot 22 is entirely moved out of the range of the display region 21, which causes the loss of the image of the target parking spot 22.

Therefore, according to the embodiment of the present disclosure, the relative position of the center of the display region in the two-dimensional scene image to the origin of the coordinate system may be adjusted according to the target parking spot in the two-dimensional scene image, the direction of the vehicle, and the movement direction of the vehicle. Specifically, the center O of the display region 21 in FIG. 5 is moved in the direction away from the movement direction to change the relative position of the center O of the display region 21 to the origin O' to obtain a new relative position of the center O of the display region 21 in FIG. 6 to the origin O', so that the entire regions of the vehicle 10 and the target parking spot 22 are located in the display region in the parking process (as shown in FIG. 6), and then, the problem of less satisfying of parking experience caused by the loss of the images of the vehicle and the target parking spot is reduced.

It needs to be noted that the operation that the relative position of the center of the display region in the two-dimensional scene image to the origin of the coordinate system is adjusted may be specifically implemented by the viewing angle interception module of the vehicle-mounted terminal in FIG. 2.

Optionally, step 208 may include:

Substep 2084, determining an adjustment speed for moving the center of the display region according to a movement speed of the vehicle.

Substep 2085, moving the center of the display region according to the adjustment speed, so as to adjust the relative position of the center of the display region to the origin.

In the embodiment of the present disclosure, as referred to FIG. 2, the movement relationship controller module of the vehicle-mounted terminal may further collect the movement speed of the vehicle, and the adjustment speed for moving the center of the display region may be calculated according to the movement speed of the vehicle in the process that the relative position of the center of the display region in the two-dimensional scene image to the origin of the coordinate system is adjusted, so that a dynamic effect of a picture of the display region more conforms to the practical running condition of the vehicle, and the display effect of the parking image is improved.

Optionally, after step 205, the method may further include:

Step 209, in the display region, when the center of the display region is kept to overlap with the origin, and a distance from the vehicle to an edge of the display region is within a preset distance range, adjusting a mode that the center of the display region is kept to overlap with the origin to a mode that a current relative position of the center of the display region to a center of the vehicle is kept fixed.

In the embodiment of the present disclosure, when it is set that the center of the display region is kept to overlap with the origin, the display region may be located in the central region of the two-dimensional scene image, so that the movement trajectory of the vehicle in the movement process may be clearly displayed in the display region, which facilitates intuitively displaying the operation such as advancing and reversing of the vehicle.

Therefore, when the center of the display region is kept to overlap with the origin, if the movement trajectory of the vehicle is identified to make the distance from the vehicle to the edge of the display region be within the preset distance range (such as one meter to one point five meters), it may be regarded that the current vehicle is to be moved out of the range of the display region.

In order to ensure that the image of the vehicle in the display region is not lost, in the embodiment of the present disclosure, the current relative position of the center of the display region to the vehicle may be fixed, and the mode that the center of the display region is kept to overlap with the origin is adjusted to the mode that the current relative position of the center of the display region to the center of the vehicle is kept fixed, at the moment, the running action of the vehicle in the display region is stopped, and the vehicle is located on a fixed position in the display region. Such a design is due to the fact that if the vehicle further moves forwards, the look-around function of the vehicle may be affected, and a user may not affirm whether there is an obstacle in the movement direction of the vehicle in the image. The mode that the center of the display region is kept to overlap with the origin is adjusted to the mode that the current relative position of the center of the display region to the center of the vehicle is kept fixed; and if the current relative position of the center of the display region to the center of the vehicle is that the center of the display region is located at the rear of the center of the vehicle, and is spaced for ten meters from the center of the vehicle, such a relative position of the center of the display region to the center of the vehicle may be kept in the subsequent movement process of the vehicle, in this way, at least part of the environmental information surrounding the vehicle cannot be lost, so that the purpose of identifying the obstacle in the movement direction of the vehicle is achieved.

In summary, the embodiment of the present disclosure provides the parking process display method including: establishing an image of a scene where the vehicle is located, and the image is established based on a preset coordinate system; determining a display region in the image, and displaying the display region, wherein the display region including the vehicle; identifying a parking spot in the image; when at least parts of regions of a target parking spot and/or of the vehicle are located outside the display region, adjusting a relative position of a center of the display region in the image to an origin of the preset coordinate system, to enable entire regions of the vehicle and the target parking spot to be located in the display region. In the embodiment of the present disclosure, since the display of the vehicle-mounted terminal is limited in display range, in order to guarantee the integrity of the parking image displayed in the display region in the parking process, in the embodiment of the present disclosure, when the images of the target parking spot and/or vehicle in the display region are incomplete, the relative position of the center of the display region to the origin of the coordinate system of the two-dimensional scene image may be adjusted to change the position of the display region with respect to the two-dimensional scene image, so that the entire regions of the vehicle and the target parking spot are located in the display region, and then, the probability that the problem of integrity loss of the parking image in the parking process occurs is reduced.

On the basis of the above-mentioned embodiment, an embodiment of the present disclosure further provides a parking process display device.

Figure 10:
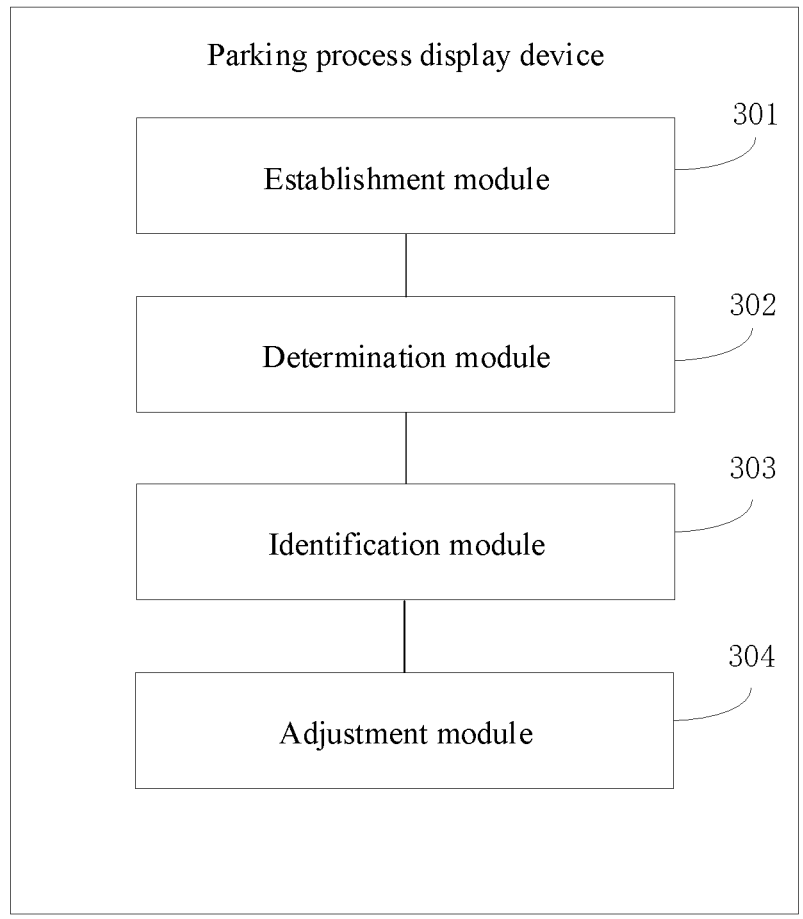
FIG. 10 shows a structural block diagram of a parking process display device according to an embodiment of the present disclosure.

As referred to FIG. 10, FIG. 10 shows a structural block view of a parking process display device applied to a mobile terminal according to an embodiment of the present disclosure, the parking process display device may specifically include the following modules:

an establishment module 301 configured for, establishing an image of a scene where the vehicle is located, and the image is established based on a preset coordinate system.

Optionally, the vehicle is provided with at least one wide-angle sensor 11, and the establishment module 301 may include:

an acquisition submodule configured for, acquiring environmental information collected by the wide-angle sensors;

an establishment submodule configured for, establishing a three-dimensional scene image used for reflecting the scene where the vehicle is located according to the environmental information; and a mapping submodule configured for, mapping the three-dimensional scene image into a two-dimensional scene image with a preset size to obtain a two-dimensional scene image of the scene where the vehicle is located.

A determination module 302 configured for, determining a display region in the image, and display the display region, the display region including the vehicle.

Optionally, the determination module 302 includes:

a size determination submodule configured for, determining the size of the display region according to the size of a display screen of the vehicle-mounted terminal; and a region determination submodule configured for, determining the display region in the image according to the size of the display region.

An identification module 303 configured for, identifying parking spots in the image.

An adjustment module 304 configured for, when at least parts of regions of a target parking spot and/or of the vehicle are located outside the display region, adjusting a relative position of a center of the display region in the image to an origin of the preset coordinate system, to enable entire regions of the vehicle and the target parking spot to be located in the display region.

Optionally, the adjustment module 304 includes:

an identification submodule configured for, when at least part of the region of the target parking spot is located outside the display region, identifying the movement direction of the vehicle in the image; and a movement submodule configured for, moving the center of the display region according to the movement direction, so as to adjust the relative position of the center of the display region to the origin.

Optionally, the adjustment module 304 includes:

a speed identification submodule configured for, determining an adjustment speed for moving the center of the display region according to a movement speed of the vehicle; and an adjustment submodule configured for, moving the center of the display region according to the adjustment speed, so as to adjust the relative position of the center of the display region to the origin.

Optionally, the device further includes:

a fixing module configured for, in the display region, when the center of the display region is kept to overlap with the origin, and a distance from the vehicle to an edge of the display region is identified to be within a preset distance range, adjust a mode that the center of the display region is kept to overlap with the origin to a mode that a current relative position of the center of the display region to a center of the vehicle is kept fixed.

Optionally, the device further includes:

a default setting module configured for, setting the center of the display region, the center of the vehicle and the origin to overlap in a two-dimensional scene image;

wherein in a movement process of the vehicle, the center of the display region is kept to overlap with the center of the vehicle, or the center of the display region is kept to overlap with the origin.

In summary, the embodiment of the present disclosure provides the parking process display device including: establishing an image of a scene where the vehicle is located, and the image is established based on a preset coordinate system; determining a display region in the image, and displaying the display region, wherein the display region including the vehicle; identifying a parking spot in the image; when at least parts of regions of a target parking spot and/or of the vehicle are located outside the display region, adjusting a relative position of a center of the display region in the image to an origin of the preset coordinate system, to enable entire regions of the vehicle and the target parking spot to be located in the display region. In the embodiment of the present disclosure, since the display of the vehicle-mounted terminal is limited in display range, in order to guarantee the integrity of the parking image displayed in the display region in the parking process, in the embodiment of the present disclosure, when the images of the target parking spot and/or vehicle in the display region are incomplete, the relative position of the center of the display region to the origin of the coordinate system of the image may be adjusted to change the position of the display region with respect to the image, so that the entire regions of the vehicle and the target parking spot are located in the display region, and then, the probability that the problem of integrity loss of the parking image in the parking process occurs is reduced.

As referred to FIG. 2, an embodiment of the present disclosure further provides a vehicle 10, the vehicle 10 includes a vehicle-mounted terminal 12, and the vehicle further includes a parking process display device.

The skilled in the art may clearly know that, for the purpose of convenient and simple description, the specific working processes of the above-mentioned system, device and units may refer to the corresponding processes in the foregoing embodiments of the method, the descriptions thereof are omitted herein.

An embodiment of the present disclosure further provides computation processing equipment including a memory in which a compute readable code is stored; and one or more processors, when the computer readable code is executed by the one or more processors, the computation processing equipment performing the above-mentioned parking process display method. Specifically, the computation processing equipment may be vehicle-mounted terminal equipment.

An embodiment of the present disclosure further provides a computer readable storage medium in which a computer program is stored, when an instruction in the storage medium is executed by the processors of the computation processing equipment, the computation processing equipment being enabled to be capable of performing the above-mentioned parking process display method.

The above-mentioned embodiment of the apparatus is merely schematic, wherein the units described as separation components may be or not be physically separated, and components serving as units for display may be or not be physical units, that is, they may be located on the same place or distributed on a plurality of network units. Parts or all of the modules may be selected according to an actual demand to achieve the purpose of the solution in the present embodiment. The present disclosure may be understood and implemented by those of ordinary skill in the art without creative work.

The embodiments of all the components in the present disclosure may be implemented by virtue of hardware or a software module running on one or more processors or their combinations. It should be understood by the skilled in the art that some or all functions of some or all of the components in computation processing equipment according to an embodiment of the present disclosure may be achieved in practice by using a microprocessor or a digital signal processor (DSP). The present disclosure may be further implemented as a part or all of equipment or device programs (such as a computer program and a computer program product) for performing the method described herein. Such programs for achieving the present disclosure may be stored in a computer readable medium or in a manner that one or more signals are provided. Such signals may be downloaded from a website of the Internet or provided on carrier signals or provided in any other forms.

Figure 11:
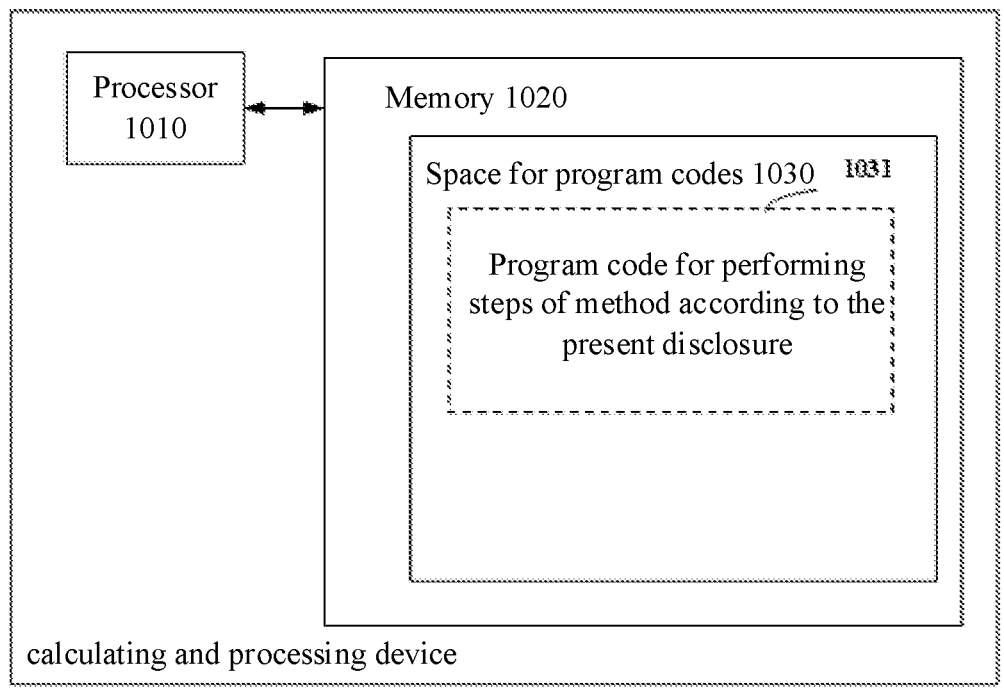
FIG. 11 schematically shows a block diagram of computation processing equipment for performing the method according to the present disclosure.
Figure 12:
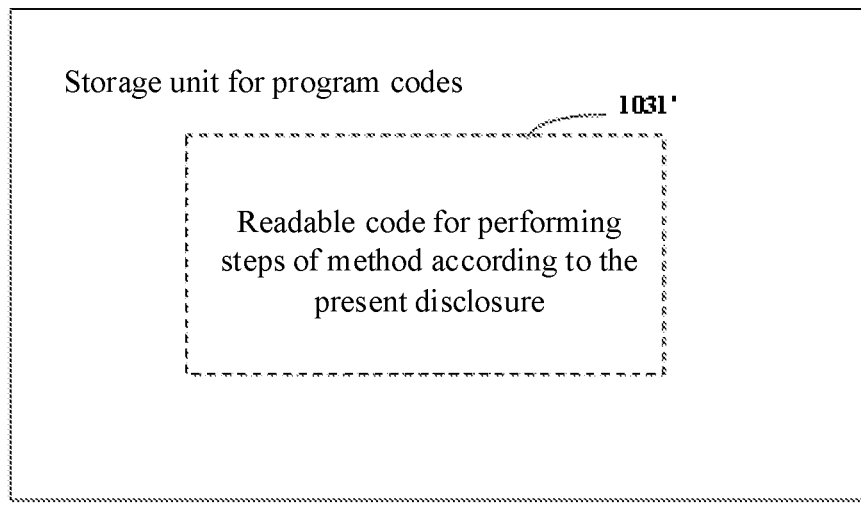
FIG. 12 schematically shows a storage unit for keeping or carrying a program code for implementing the method according to the present disclosure.

For example, FIG. 11 shows computation processing equipment capable of implementing the method according to the present disclosure. The computation processing equipment traditionally includes a processor 1010 and computer program products or computer readable mediums in a form of a memory 1020. The memory 1020 may be an electronic memory such as a flash memory, an EEPROM (Electrically Erasable Programmable Read-Only Memory), an EPROM, a hard disk or an ROM. The memory 1020 is provided with a storage space 1030 for program codes 1031 for performing the steps of any method in the above-mentioned methods. For example, the storage space 1030 for the program codes may include the various program codes 1031 respectively used for implementing all the steps of the above method. These program codes may be read from one or more computer program products or written into one or more of the computer program products. These computer program products include program code carriers such as hard disks, compact discs (CD), memory cards or floppy disks. Such computer program products are generally shown with reference to FIG. 12. The above descriptions are merely preferred embodiments of the present disclosure, but are not intended to limit the present disclosure. Any modifications, equivalent replacements, improvements and the like made within the spirit and principle of the present disclosure shall fall within the protection scope of the present disclosure.

The above descriptions are merely specific implementations of the present disclosure, but the protection scope of the present disclosure is not limited thereto. Any variations or replacements that can be readily envisioned by those skilled in the art within the technical scope disclosed by the present disclosure fall within the protection scope of the present disclosure. Hence, the protection scope of the present disclosure should be subject to the protection scope defined in the claims.

The invention claimed is:

1. A parking process display method, applied to a vehicle-mounted terminal of a vehicle, wherein the method comprises:
    establishing an image of a scene where the vehicle is located, and the image is established based on a preset coordinate system;
    determining a display region in the image, and displaying the display region, wherein the display region comprising the vehicle;
    identifying a parking spot in the image; and
    when at least parts of regions of a target parking spot and/or of the vehicle are located outside the display region, adjusting a relative position of a center of the display region in the image to an origin of the preset coordinate system, to enable entire regions of the vehicle and the target parking spot to be located in the display region.

2. The method according to claim 1, wherein when at least parts of the regions of the target parking spot and/or of the vehicle are located outside the display region, adjusting the relative position of the center of the display region in the image to the origin of the preset coordinate system, to enable the entire regions of the vehicle and the target parking spot to be located in the display region, comprises:
    when at least part of the region of the target parking spot is located outside the display region, identifying a movement direction of the vehicle in the image; and
    moving the center of the display region according to the movement direction of the vehicle, so as to adjust the relative position of the center of the display region to the origin.

3. The method according to claim 2, wherein the step of moving the center of the display region according to the movement direction of the vehicle, so as to adjust the relative position of the center of the display region to the origin comprises:
when the target parking spot is located on a side pointed by the movement direction of the vehicle, moving the center of the display region in the movement direction to change the relative position of the center of the display region to the origin.

4. The method according to claim 2, wherein the step of moving the center of the display region according to the movement direction of the vehicle, so as to adjust the relative position of the center of the display region to the origin comprises:
when the target parking spot is located on the side pointed by a direction away from the movement direction of the vehicle, moving the center of the display region in the direction away from the movement direction to change the relative position of the center of the display region to the origin.

5. The method according to claim 1, wherein after determining the display region in the image, and displaying the display region, the method further comprises:
in the display region, when the center of the display region is kept to overlap with the origin, and a distance from the vehicle to an edge of the display region is within a preset distance range, adjusting a mode that the center of the display region is kept to overlap with the origin to a mode that a current relative position of the center of the display region to a center of the vehicle is kept fixed.

6. The method according to claim 1, wherein adjusting the relative position of the center of the display region in the image to the origin of the preset coordinate system comprises:
determining an adjustment speed for moving the center of the display region according to a movement speed of the vehicle; and
moving the center of the display region according to the adjustment speed, so as to adjust the relative position of the center of the display region to the origin.

7. The method according to claim 1, wherein after determining the display region in the image, the method further comprises:
setting the center of the display region, the center of the vehicle and the origin to overlap in the image;
wherein in a movement process of the vehicle, the center of the display region is kept to overlap with the center of the vehicle, or the center of the display region is kept to overlap with the origin.

8. The method according to claim 1, wherein the image is a two-dimensional scene image.

9. The method according to claim 8, wherein the vehicle is provided with at least one wide-angle sensor, and establishing the image of the scene where the vehicle is located comprises:
acquiring environmental information collected by the wide-angle sensor;
establishing a three-dimensional scene image of the scene where the vehicle is located according to the environmental information; and
mapping the three-dimensional scene image into a two-dimensional scene image with a preset size to obtain the two-dimensional scene image of the scene where the vehicle is located.

10. The method according to claim 1, wherein determining the display region in the image comprises:
determining a size of the display region according to a size of a display screen of the vehicle-mounted terminal; and
determining the display region in the image according to the size of the display region.

11. A parking process display device applied to a vehicle-mounted terminal of a vehicle, wherein the device comprises:
one or more processors and a storage apparatus; and
the storage apparatus stores a computer program which, when executed by the processor, performs the operations comprising:
establishing an image of a scene where the vehicle is located, and the image is established based on a preset coordinate system;
determining a display region in the image, and display the display region, the display region comprising the vehicle;
identifying a parking spot in the image; and
when at least parts of regions of a target parking spot and/or of the vehicle are located outside the display region, adjusting a relative position of a center of the display region in the image to an origin of the preset coordinate system, to enable entire regions of the vehicle and the target parking spot to be located in the display region.

12. The device according to claim 11, wherein the operations comprise:
when at least part of the region of the target parking spot is located outside the display region, identifying a movement direction of the vehicle in the image; and
moving the center of the display region according to the movement direction of the vehicle, so as to adjust the relative position of the center of the display region to the origin.

13. The device according to claim 11, wherein the operations comprise:
determining an adjustment speed for moving the center of the display region according to a movement speed of the vehicle; and
moving the center of the display region according to the adjustment speed, so as to adjust the relative position of the center of the display region to the origin.

14. The device according to claim 11, wherein the operations performed by the device further comprise:
in the display region, when the center of the display region is kept to overlap with the origin, and a distance from the vehicle to an edge of the display region is within a preset distance range, adjusting a mode that the center of the display region is kept to overlap with the origin to a mode that a current relative position of the center of the display region to a center of the vehicle is kept fixed.

15. The device according to claim 11, wherein the operations performed by the device further comprise:
setting the center of the display region, the center of the vehicle and the origin to overlap in a two-dimensional scene image;
wherein in a movement process of the vehicle, the center of the display region is kept to overlap with the center of the vehicle, or the center of the display region is kept to overlap with the origin.

16. A vehicle comprising a vehicle-mounted terminal, wherein the vehicle further comprises the parking process display device according to claim 11.

17. A non-transitory computer-readable storage medium, wherein the non-transitory computer-readable storage medium stores a computer program, when an instruction in the storage medium is executed by a processor of a calculating and processing device, the calculating and processing device is capable of implementing the parking process display method according to claim 1.

* * * * *